United States Patent
Vert et al.

(10) Patent No.: US 6,588,489 B1
(45) Date of Patent: Jul. 8, 2003

(54) APPARATUS FOR DIE CASTING AN INTERNAL PASSAGEWAY AND A PRODUCT MANUFACTURED THEREWITH

(75) Inventors: Peter J. Vert, Maple (CA); George Spiller, Mississauga (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 09/277,182

(22) Filed: Mar. 26, 1999

Related U.S. Application Data
(60) Provisional application No. 60/079,605, filed on Mar. 27, 1998.

(51) Int. Cl.[7] .............................................. B22D 33/04
(52) U.S. Cl. ....................... 164/340; 164/341; 164/342; 123/195 C
(58) Field of Search ................... 164/340, 137, 164/342, 341; 123/195 C (56) References Cited

U.S. PATENT DOCUMENTS

| | | | |
|---|---|---|---|
| 1,659,837 A | 2/1928 | Ryan | |
| 2,065,287 A | 12/1936 | Nutt | |
| 2,204,407 A | 6/1940 | Flammang et al. | |
| 3,049,768 A | 8/1962 | Powell | |
| 3,098,270 A | 7/1963 | Bauer | |
| 3,698,471 A | 10/1972 | Chatourel et al. | |
| 4,446,906 A | 5/1984 | Ackerman et al. | 164/112 |
| 4,559,989 A | 12/1985 | Kawai et al. | 164/228 |
| 4,993,475 A | 2/1991 | Yamada | 164/340 |
| 5,285,840 A | 2/1994 | Hayashi et al. | 164/132 |
| 5,388,632 A | 2/1995 | Bayliss | 164/131 |
| 5,474,119 A * | 12/1995 | Jonsson | 164/137 |
| 5,601,060 A * | 2/1997 | Smietanski et al. | 123/195 C |
| 5,615,728 A | 4/1997 | Lee | 164/340 |
| 5,901,679 A * | 5/1999 | Tanaka et al. | 123/195 C |
| 6,041,752 A * | 3/2000 | Van Klompenburg | 123/195 C |

FOREIGN PATENT DOCUMENTS

EP    0 837 236    4/1998

\* cited by examiner

*Primary Examiner*—Tom Dunn
*Assistant Examiner*—I. H. Lin
(74) *Attorney, Agent, or Firm*—Robert J. Graham; Gowling Lafleur Henderson LLP (57) ABSTRACT

A die casting apparatus comprises a pair of mold assemblies which include molding surfaces cooperating to define a first mold cavity therebetween for casting a first portion of a cast object in the first mold cavity. One of the mold assemblies comprises a fixed mold core, and a movable mold core movable with respect to the fixed mold core along a core axis between a closed position and an open position. The mold cores include casting surfaces disposed such that in the closed position the casting surfaces cooperate to define a second mold cavity therebetween extending transversely to the core axis and in communication with the first mold cavity for casting a remaining portion of the object integral with the first portion, while in the released position the object is substantially released from the one mold assembly.

8 Claims, 8 Drawing Sheets

APPARATUS FOR DIE CASTING AN INTERNAL PASSAGEWAY AND A PRODUCT MANUFACTURED THEREWITH

This application claims the benefit of Provisional Application Ser. No. 60/079,605 filed Mar. 27, 1998.

FIELD OF THE INVENTION

The present invention relates to an apparatus for die casting an internal passageway. In particular, the present invention relates to an apparatus for die casting an object having an internal passageway extending transversely to the line of draw of the mold and an object manufactured with such apparatus.

BACKGROUND OF THE INVENTION

Oil pans for automotive engines are commonly manufactured as an aluminum die cast. The die casting process is preferred over other casting methods, such as sand or investment casting, because die casting generally has a higher production rate and the process can be more automated.

Four wheel drive vehicles such as sport utilities and pick up trucks have become increasingly popular. With the increasing demand for these vehicles, there has been a desire on the part of the vehicle manufacturers to increase power and functionality of the vehicles without significantly increasing the size of the engine and the vehicle. As a result, engine designers have specified that the transmission axle is to extend through the oil pan without affecting the oil capacity of the pan, thereby requiring an internal passageway.

An undercut structure which extends transverse to the line of draw of the mold cannot be made using conventional die casting techniques. The undercut makes it impossible for the cast object to be removed from conventional molds. As a result, undercut structures are generally cast using sand casting techniques wherein the mold core which forms the undercut is broken away after the cast object has been removed from the mold. Such a technique is described in U.S. Pat. No. 4,961,458.

The additional steps of forming a sand cast and removing the sand cast increases cycle time increases the need for manual labor and, ultimately, the cost of the finished cast product.

SUMMARY OF THE INVENTION

According to the present invention, there is a provided a die casting apparatus which addressed the disadvantages of the prior art die casting molds.

The die casting apparatus, according to the present invention, comprises a pair of mold assemblies which include molding surfaces cooperating to define a first mold cavity therebetween for casting a first portion of a cast object therein. One of the mold assemblies comprises a fixed mold core, and a movable mold core movable with respect to the fixed mold core along a core axis between a closed position and an open position. The mold cores include casting surfaces disposed such that in the closed position the casting surfaces cooperate to define a second mold cavity therebetween extending transversely to the core axis and in communication with the first mold cavity for casting a remaining portion of the object integral with the first portion, while in the released position the object is substantially released from the one mold assembly.

In a preferred embodiment of the invention, the mold assemblies are movable with respect to each other, along a mold axis, between an open mold position and a closed mold position. The mold assemblies comprise a male mold assembly and a female mold assembly for receiving the male mold assembly therein, with the first mold cavity defined therebetween being shaped for casting a side wall and a base integrally cast with the side wall. The second mold cavity is shaped for casting a tubular passageway integrally cast with the side wall. Preferably, the die casting apparatus also includes a transversely-movable core which is movable within the second mold cavity for casting the tubular passageway between the casting surfaces and the transversely-movable core.

The male mold assembly includes the fixed mold core and the movable mold core. The movable mold core moves relative to the fixed mold core between the closed casting position and the open removal position. The molding surface of the movable mold core is positioned at the end of the movable mold core and is oriented such that when the movable mold core is in the casting position, the molding surface of the movable mold core coincides with the molding surface of the fixed mold core. In addition, the movable core casting surface is positioned a distance from the end of the movable core molding surface.

Once the object has been cast, the male mold assembly and the female mold assembly open and move to the open mold position, and the transversely-movable core is withdrawn from the second mold cavity. The movable mold core casting surface then moves relative to the fixed mold core casting surface urging the tubular passageway away from the fixed mold core casting surface while also urging the side wall and base away from the fixed core molding surface. Once in the removal position, the cast object is dislodged from the movable core by moving the cast object transversely with respect to the mold cores. The movable core is then returned to the casting position and the cycle is repeated.

BRIEF DESCRIPTION OF THE DRAWINGS

The preferred embodiment of the invention will now be described, by way of example, with reference to the drawings, in which.

DETAILED DESCRIPTION OF THE PREFERRED EMBODIMENT

Figure 1:
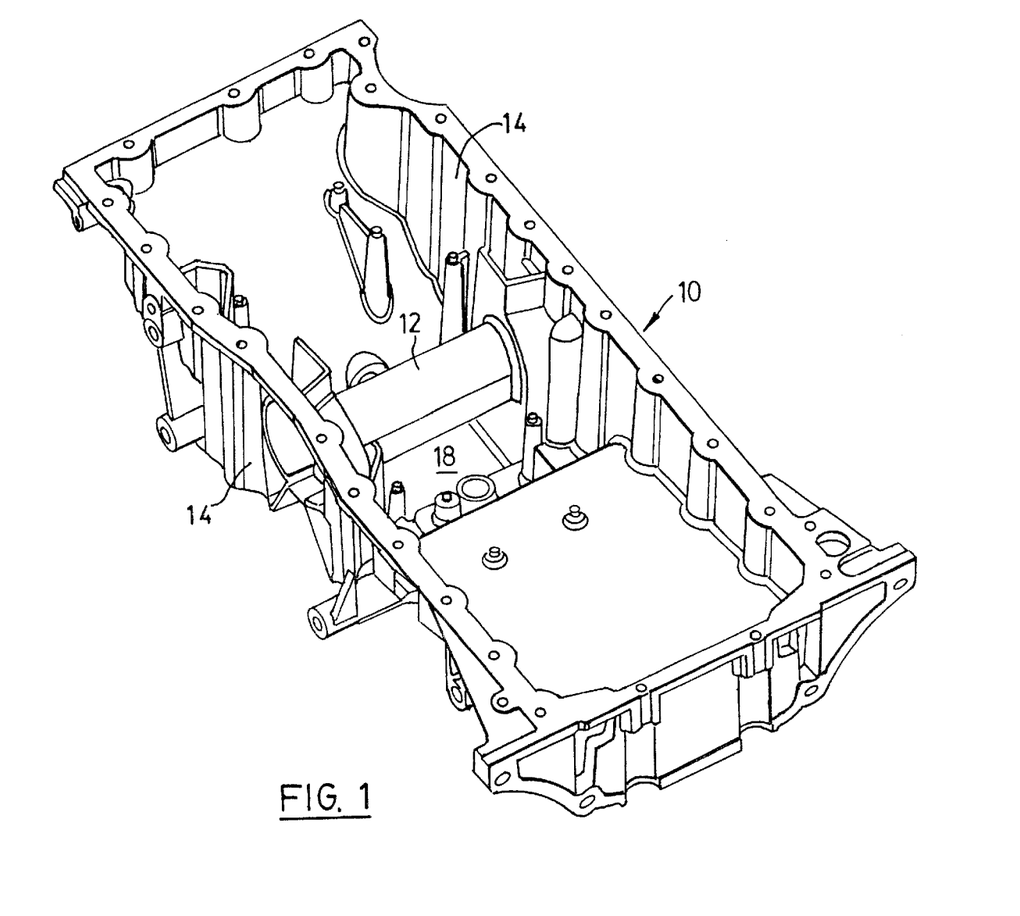
FIG. 1 is a perspective view of an oil pan manufactured by the present invention.
Figure 2:
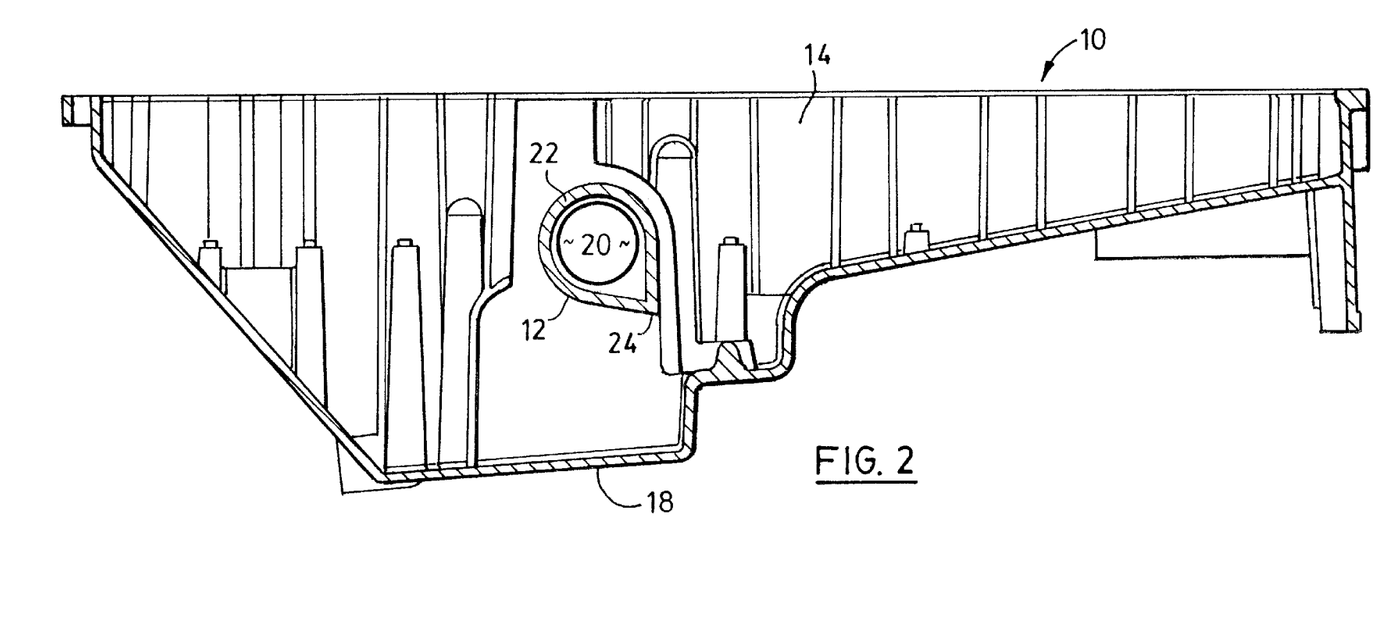
FIG. 2 is sectional view of the oil pan of FIG. 1.

An oil pan 10 having a tubular passageway structure 12 of the present invention is illustrated in FIGS. 1 and 2. With the exception of the tubular passageway structure 12, the oil pan 10 is otherwise of conventional die cast manufacture. Thus the design of the oil pan 10 is governed by techniques well known in the art.

The passageway structure 12 extends transversely from opposite side walls 14 of the oil pan 10 to present a through opening 20. The passageway structure 12 is elevated with respect to the bottom 18 of the oil pan 10. Thus, the passageway structure 12 does not interfere with the free movement of oil retained in the oil pan 10.

The wall 22 of the tubular passageway structure 12 has a generally uniform thickness except for a pointed lobe 24 which is formed as a result of the mold assemblies so that the cast oil pan 10 can be removed from the die cast apparatus, as will be apparent from the following discussion.

Figure 3:
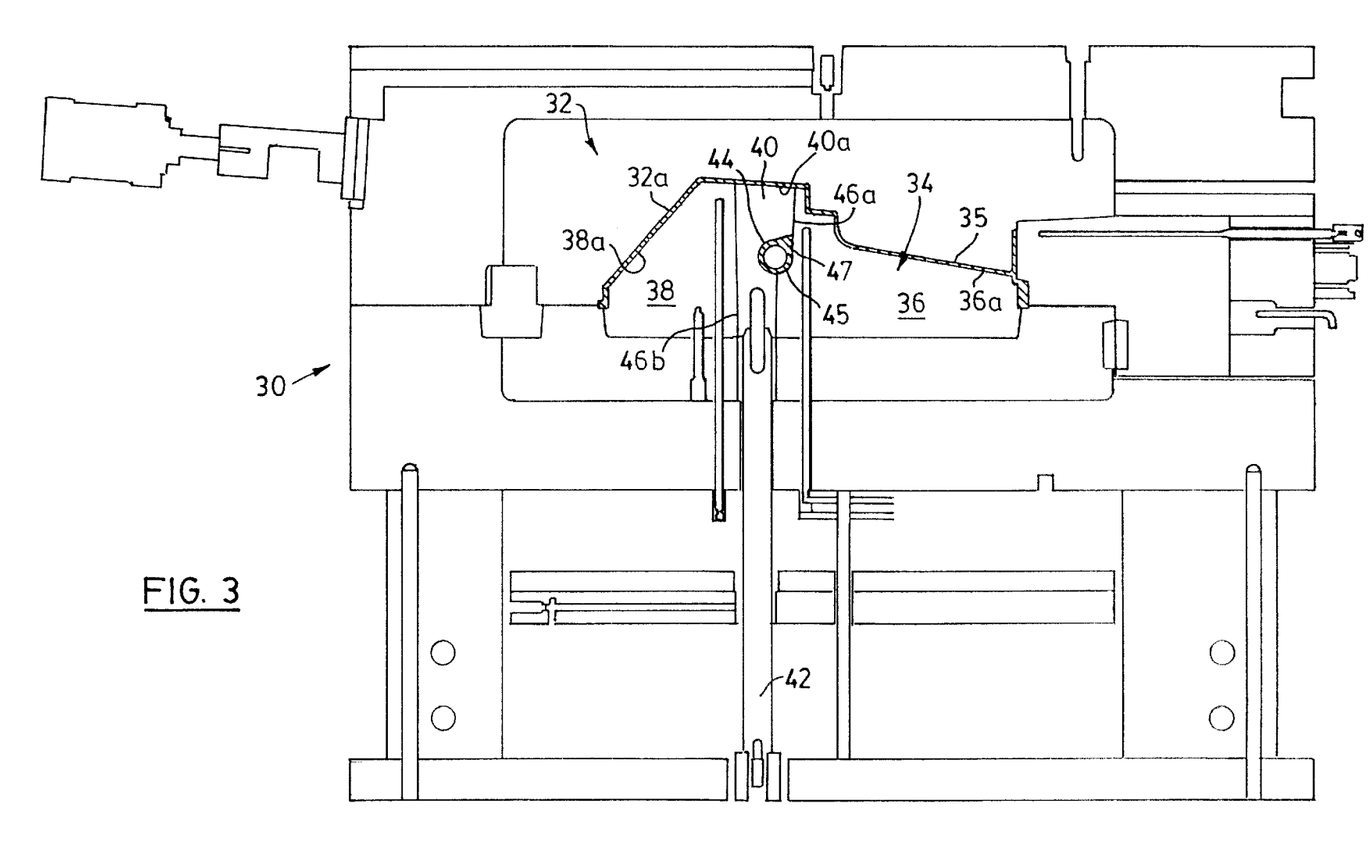
FIG. 3 is a side sectional view of the die casting apparatus, according to the present invention, for casting the oil pan of FIG. 1, showing the mold assemblies in the closed mold position.
Figure 4:
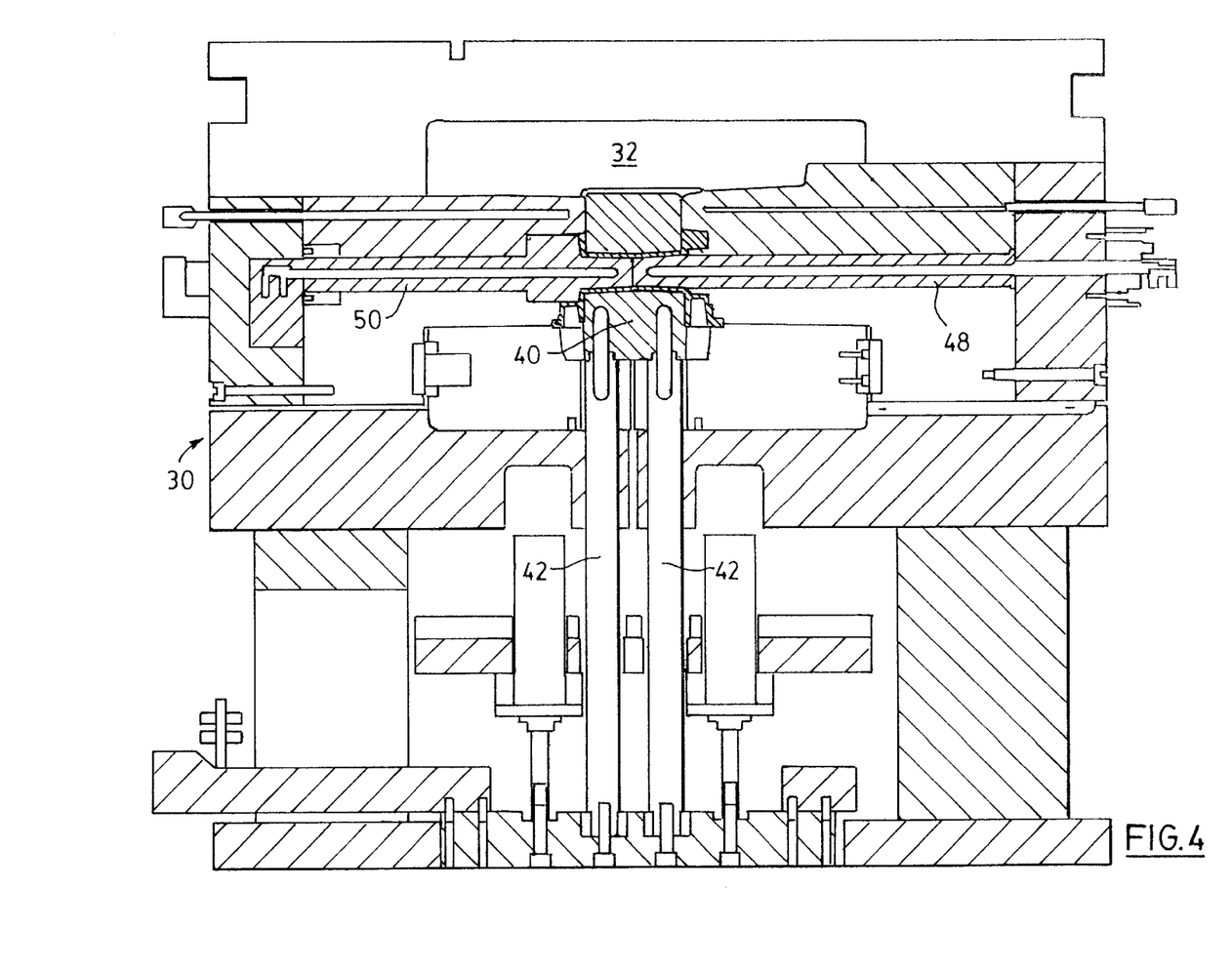
FIG. 4 is a top plan sectional view of die casting apparatus of FIG. 3, showing the mold assemblies in the closed mold position.

Referring to FIGS. 3 and 4, a die casting apparatus 30, according to the present invention, is shown mounted in a conventional die casting press. The die casting apparatus 30 generally comprises a female mold assembly 32 and a male mold assembly 34 which are mounted on a suitable drive for reciprocating driving movement relative to each other between an open mold position and a closed mold position. The female mold assembly 32 includes conventional ports for receiving and transferring molten material into a mold cavity defined between the female mold assembly 32 and the male mold assembly 34, as is conventional in the art.

The female mold assembly 32 has a molding surface 32a which is complementary to the outer surface of the oil pan 10. The male mold assembly 34 has a molding surface which is complementary to the inner surface of the oil pan 10. The molding surface 32a of the female mold assembly 32 and the molding surface of the male mold assembly 34 cooperate to define a mold cavity 35 therebetween for integrally casting the bottom 18 of the oil pan 10 with the side walls 14.

The male mold assembly 34 comprises first and second fixed mold cores 36, 38, and a movable mold core 40 which is movable with respect to the fixed mold cores 36, 38. The movable mold core 40 is mounted on a drive 42 which moves the movable mold core 40 in a reciprocating manner between a "closed" or "casting" position and an "open" or "part removal" position. Preferably the movable mold core 40 moves along an axis which is parallel to the axis of movement of the mold assemblies 32, 34.

The molding surface of the male mold assembly 34 is comprised of molding surfaces 36a, 38a, 40a formed on the respective ends of the mold cores 36, 38, 40. In the casting position, shown in FIG. 3, the movable mold core 40 is seated between the fixed mold cores 36, 38 such that the molding surface 40a coincides with the mold surfaces 3a, 36a of the fixed mold cores 36, 38 for forming the inner surface of the oil pan 10. In the part removal position, shown in FIG. 6, the movable core molding surface 40a extends beyond the fixed core molding surfaces 36a, 38a.

The fixed mold core 36 and the movable mold core 40 have respective cooperating sliding surfaces, denoted together as 46a. Similarly, cooperating sliding surfaces 46b are provided between the movable mold core 40 and the fixed mold core 38. Preferably, the sliding surfaces 46a, 46b taper away from the axis of movement of the movable mold core 40, from the casting position to the open position, for allowing the movable mold core 40 to be readily extended past the fixed mold cores 36, 38 so as to allow the cast object to be removed from the male mold assembly 34.

The movable mold core 40 has a casting surface 44, comprising an arcuate cutout portion and a substantially planar portion, positioned a distance from the molding surface 40a for forming part of the passageway structure 12. The fixed mold core 36 has a casting surface 45 which is complementary to the movable core casting surface 44 for forming the passageway 12. When the movable mold core 40 is in the casting position, the movable core casting surface 44 and the fixed core casting surface 45 cooperate to form a transverse cavity 47 which is in communication with the mold cavity 35 and which extends transversely to the axis of movement of the movable mold core 40. In addition, the planar portions of the casting surfaces 44, 45 intersect to form the lobe 24. However, when the movable core 40 is in the part removal position, the movable core casting surface 44 is positioned a distance away from the fixed core casting surface 45.

The die casting apparatus 30 also includes a pair of transversely-movable cores 48 and 50. The cores 48, 50 are mounted on suitable drives for reciprocating movement in a direction transverse to the axis of movement of the movable core 40, between an "inserted" or "casting" position and a "withdrawn" or "retracted" position. In the casting position, the cores 48, 50 extend through the transverse cavity 47 defined by the casting surfaces 44, 45 of the movable core 40 and the fixed mold core 36. In this position, the cores 48, 50 abut in an end-to-end manner, and are spaced inwardly of the casting surfaces 44, 45 to form the wall 22 of the tubular passageway structure 12 therebetween.

The tips of each of the cores 48, 50 are slightly tapered to enhance removal of the cores 48, 50 after casting. Optionally, a single tapered core which extends from one side of the mold could be used with satisfactory results.

Referring now to FIGS. 3 through 8, the method of operation of the die casting apparatus 30 will now be described. The molding and casting surfaces of the die casting apparatus 30 are cleaned and treated as is conventional in the art. The mold assemblies 32, 34 are then closed as illustrated in FIG. 3 and the cores 48, 50 are moved into the casting position. Molten material is then injected under pressure into the mold cavity 35 and the transverse cavity 47 to form a cast part 52 (in this case the oil pan 10) having a bottom 18, side walls 14 integrally cast with the bottom 18, and a tubular passageway 12 integrally cast with the side walls 14. Preferably, the molten material comprises a molten aluminum metal alloy. However, other materials may be used if desired.

Figure 5:
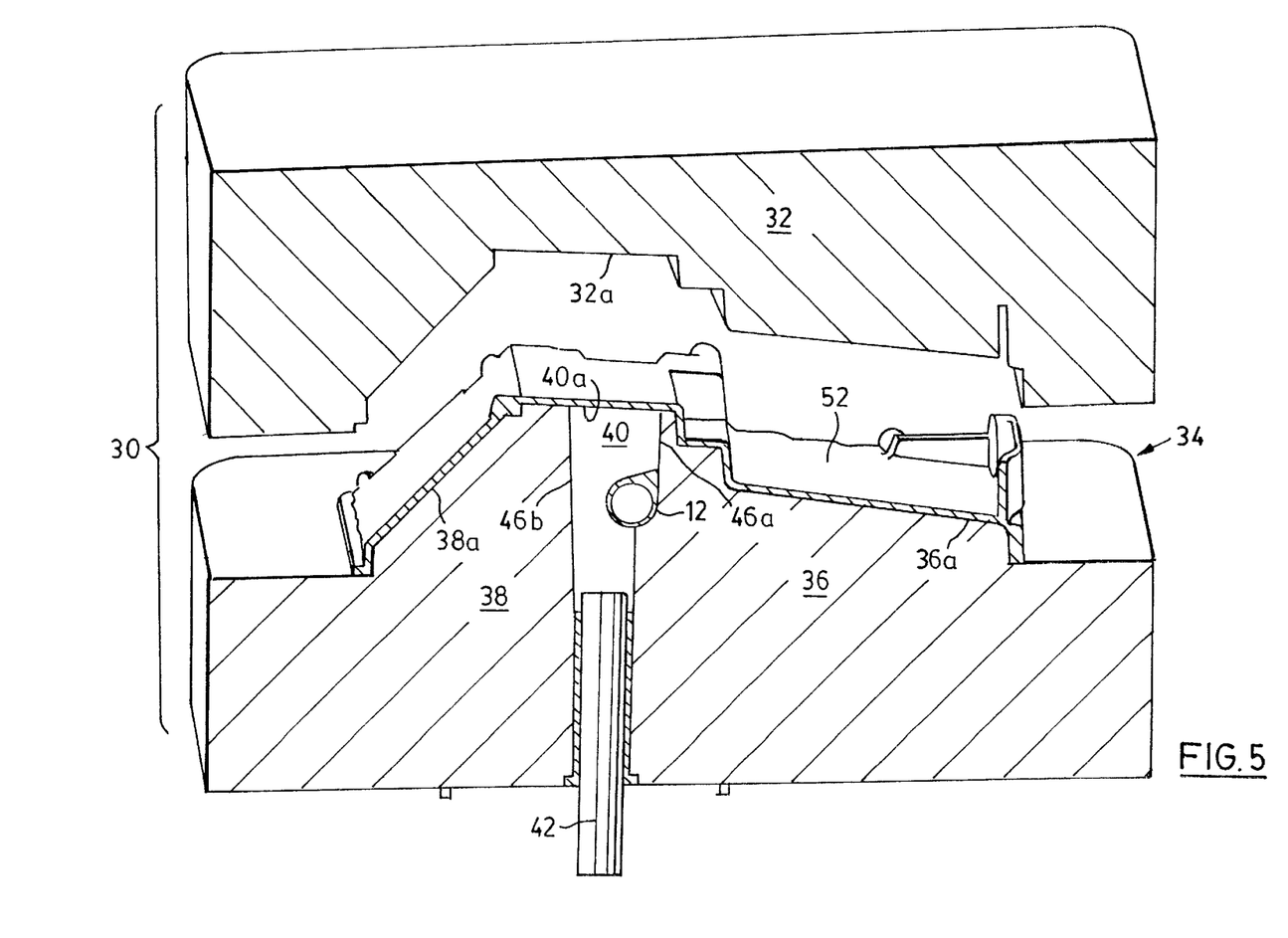
FIG. 5 is a side sectional view of the die casting apparatus of FIG. 3, showing the mold assemblies in the open mold position.

Once the cast part 52 has solidified sufficiently, the female mold assembly 32 is opened and retracted to the part removal position, as illustrated in FIG. 5. Simultaneously or sequentially, the cores 48, 50 are withdrawn from the transverse cavity 47 for allowing the cast part 52 to be subsequently removed from the die casting apparatus 30. The cast part 52 remains attached to the fixed mold cores 36, 38 and the movable mold core 40.

Figure 6:
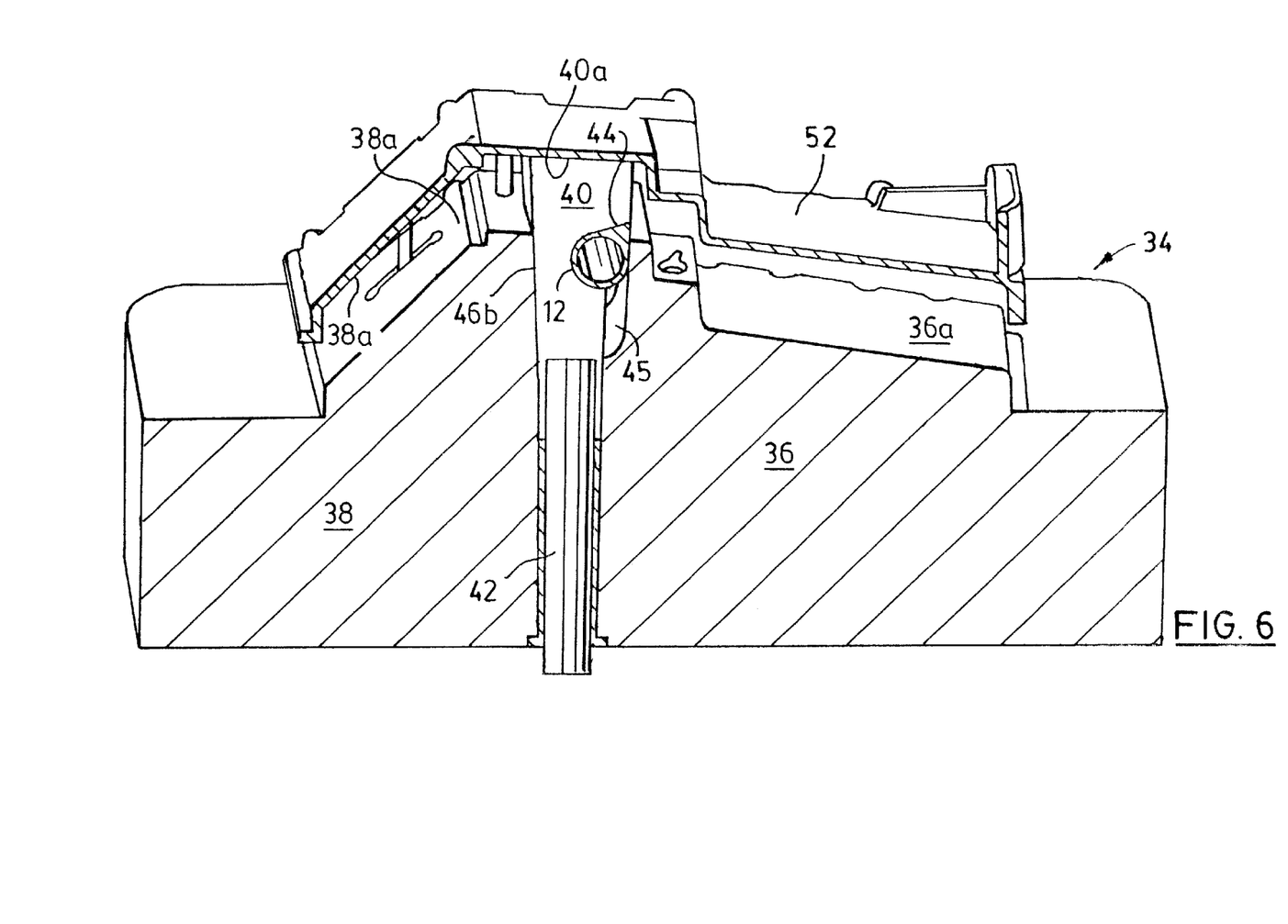
FIG. 6 is a side sectional view of the die casting apparatus of FIG. 3, showing the mold assemblies in the open mold position and the movable core moving to the open position.

The drive 42 is activated to extend the movable mold core 40 from the casting position to the part removal position, shown in FIG. 6, so as to slide the planar portion of the tubular passageway 12 (formed from the casting surface 45) along the sliding surface 46a. As a consequence, the tubular passageway 12 is pushed away from the transverse cavity 47, and the cast part 52 is pushed away from the male mold assembly 34. Depending on the size and configuration of the cast part 52, lifters and ejection pins may be required to assist in removing the cast part 52 from the fixed mold cores 36, 38.

Figure 7:
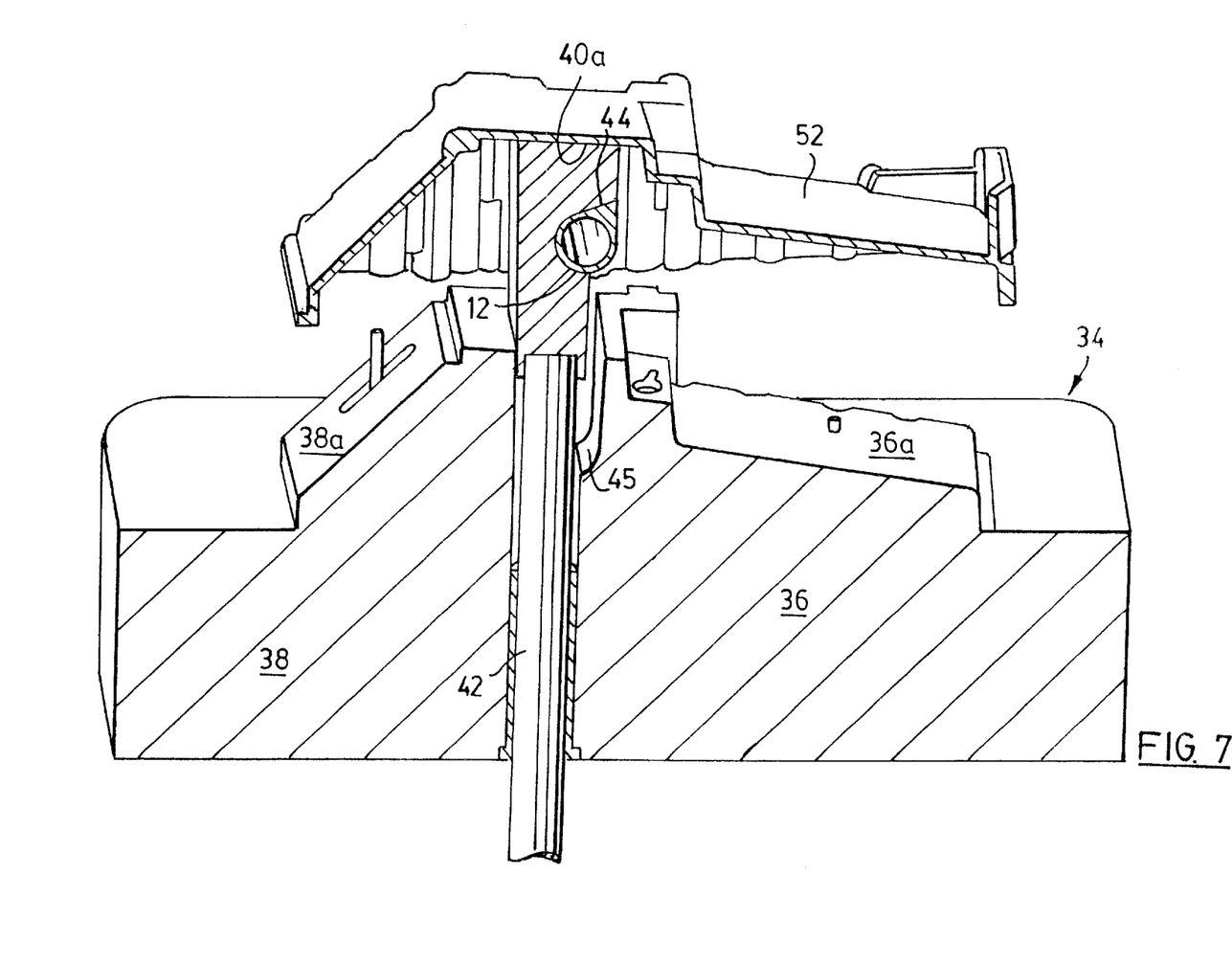
FIG. 7 is a side sectional view of the die casting apparatus of FIG. 3, showing the movable core in the open position.
Figure 8:
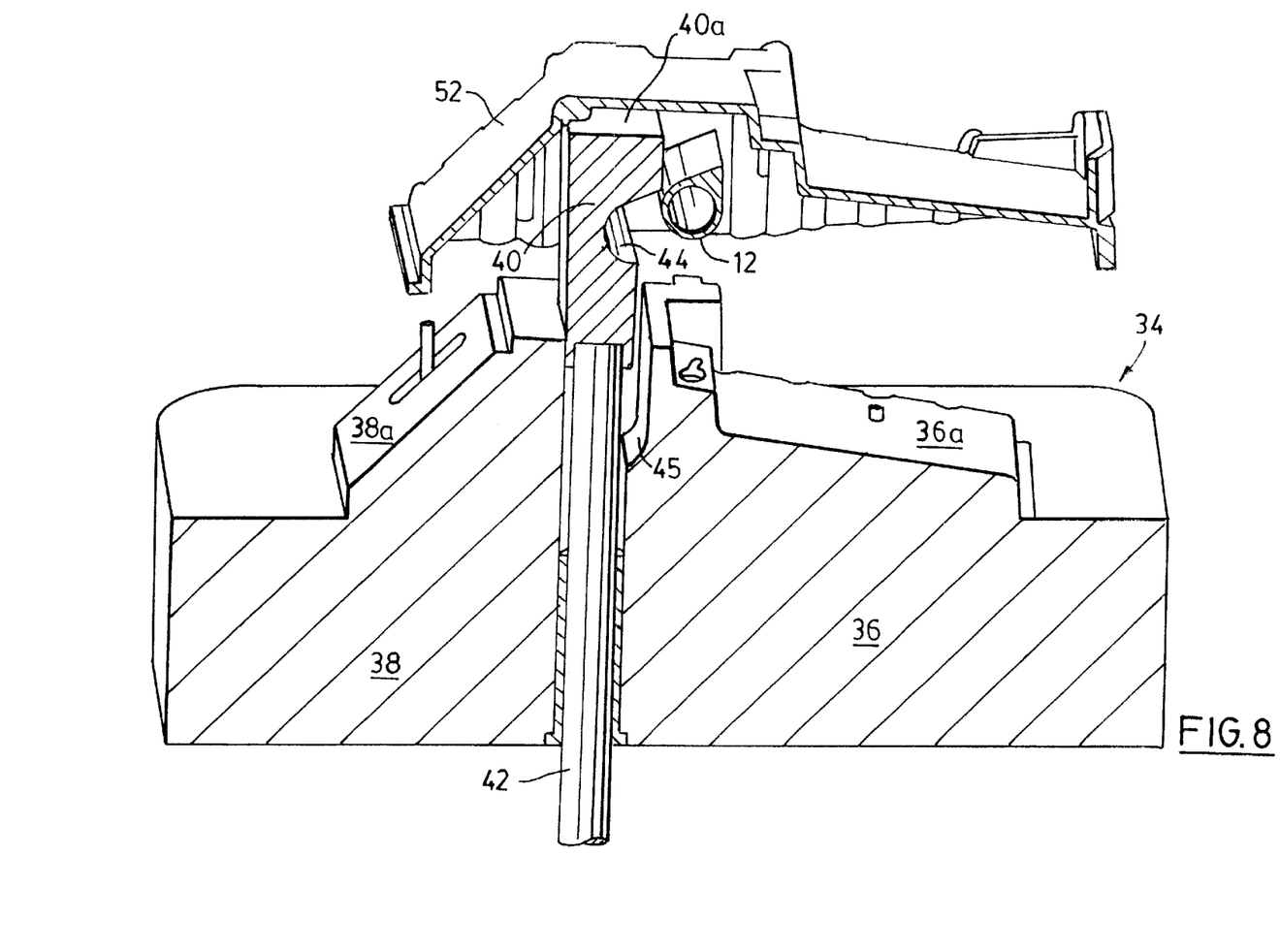
FIG. 8 is a side section view of the die casting apparatus of FIG. 3, showing the cast part being removed from the mold assemblies.

The movable mold core 40 is then fully extended, as illustrated in FIG. 7, such that the passageway structure 12 is capable of free movement with respect to the fixed mold core 36. The cast part 52 is then manipulated to break free of the movable mold core 40. Thereafter, the cast part 52 is moved transversely with respect to the axis of movement of the movable mold core 40 so as to extract the cast part 52 from the die casting apparatus 30, as illustrated in FIG. 8.

As will be appreciated, the geometry of the movable core 40 is dictated by the positioning of the passageway structure 12 and the bottom 18 of the oil pan 10. Specifically, the cast part 52 must be able to slide relative to the movable mold core 40 so that the cast part 52 may be extracted from the die casting apparatus 30. Accordingly, as is illustrated in FIG. 8, the planar portion of the tubular passageway 12 (formed from the casting surface 44) is declined somewhat with respect to the bottom 18, and the bottom 18 is substantially free of obstructions which would otherwise interfere with the transverse movement of the cast part 52.

Once the cast part 52 is removed from the movable mold core 40, the movable mold core 40 is retracted back into the casting position. The casting cycle is then repeated.

The above-described embodiment of the invention is intended to be an example of the present invention and alterations and modifications may be effected thereto, by those of skill in the art, without departing from the scope of the invention as defined by the appended claims.

We claim:

1. A vessel cast according to the steps of:

providing a pair of mold assemblies, the mold assemblies including respective molding surfaces cooperating to define a first mold cavity therebetween, the first mold cavity including abase portion for casting a base of the vessel: therein and a side portion for casting a side of the vessel therein integrally with the base and extending continuously around the base, the base and the side comprising a unitary vessel body, one of the mold assemblies comprising a first mold core and a second mold core, the mold cores each including a respective casting surface configured for defining a second mold cavity therebetween, the second mold cavity being configured for casting a member including a pair of opposite ends, the second mold cavity being in communication with the first mold cavity for casing the member integral with the vessel body at the opposite ends, the second mold cavity being oriented for disposing the member within an interior of the vessel body and being spaced apart from the base portion for casting the member distally from the base between the opposite ends;

closing the first and second mold cavities;

injecting a molten material into the mold cavities and allowing the molten material to solidify to thereby cast the unitary vessel body and to cast the member integrally with the vessel body; and removing the cast vessel from the mold cavities.

2. The vessel according to claim 1, wherein the mold assemblies are movable with respect to each other along a mold axis, the mold cores are movable with respect to each other along a core axis parallel to the mold axis, and the closing step comprises moving one of the mold assemblies along the mold axis towards the other of the mold assemblies and moving one of the mold cores along the core axis towards the other of the mold cores.

3. The vessel according to claim 2, wherein the remaining portion comprises a tubular member, and the casting step comprises inserting a movable core within the second mold cavity, and casting the tubular member between the casting surfaces and the movable core.

4. The vessel according to claim 3, wherein the removing step comprises separating the mold assemblies from one another, displacing the casting surface of the one mold core a distance along the core axis from the casting surface of the other mold core, and moving the cast vessel transversely with respect to the core axis.

5. A cast vessel comprising:

a base and a side integrally cast with the base and extending continuously around the base, the base and the side comprising a unitary vessel body defining a vessel interior therein; and a tubular member extending through the vessel interior, and including a pair of opposite ends and an outer member surface disposed between the opposite ends, the outer member surface comprising an arcuate surface portion and an apex portion extending from the arcuate surface portion, the member being integrally cast with the vessel body and presenting a through-opening at the opposite ends, and being spaced apart from the base between the opposite ends.

6. The cast vessel according to claim 5, where the apex portion comprises a first planar surface portion and a second planar surface portion, the planar surface portions extending from the arcuate surface portion and terminating at a common apex.

7. The cast vessel according to claim 6, wherein the side comprises at least two side members extending from the base, and the member extends between the two side members.

8. The cast vessel according to claim 7, wherein the tubular member is oriented parallel to the base.

* * * * *